US008949783B2

(12) United States Patent
Franke et al.

(10) Patent No.: US 8,949,783 B2
(45) Date of Patent: Feb. 3, 2015

(54) METHOD AND SYSTEM FOR LAZY DATA SERIALIZATION IN COMPUTER COMMUNICATIONS

(75) Inventors: Hubertus Franke, Cortlandt Manor, NY (US); Douglas M. Freimuth, New York, NY (US); David Paul Olshefski, Danbury, CT (US); John Michael Tracey, Scarsdale, NY (US); Dinesh C. Verma, Mount Kisco, NY (US); Charles P. Wright, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 829 days.

(21) Appl. No.: 12/827,633

(22) Filed: Jun. 30, 2010

(65) Prior Publication Data

US 2012/0005652 A1    Jan. 5, 2012

(51) Int. Cl.
*G06F 9/44* (2006.01)
*H04L 29/06* (2006.01)

(52) U.S. Cl.
CPC ..................................... *H04L 69/08* (2013.01)
USPC ........... 717/116; 717/168; 717/170; 717/172; 717/177

(58) Field of Classification Search
USPC ........................... 717/116, 168, 170, 172, 177
See application file for complete search history.

(56) References Cited

U.S. PATENT DOCUMENTS

| | | | |
|---|---|---|---|
| 5,657,259 A * | 8/1997 | Davis et al. ................... | 708/204 |
| 6,889,260 B1 | 5/2005 | Hughes | |
| 2002/0021669 A1 * | 2/2002 | Kunito et al. .................. | 370/235 |
| 2002/0032783 A1 * | 3/2002 | Tuatini ........................... | 709/229 |
| 2002/0073236 A1 * | 6/2002 | Helgeson et al. ............. | 709/246 |
| 2002/0107992 A1 * | 8/2002 | Osbourne et al. ............. | 709/310 |
| 2003/0036966 A1 * | 2/2003 | Amra et al. ..................... | 705/26 |
| 2003/0187930 A1 * | 10/2003 | Ghaffar et al. ................ | 709/205 |
| 2004/0220946 A1 | 11/2004 | Krishnaprasad et al. | |
| 2005/0169300 A1 | 8/2005 | Liu et al. | |
| 2006/0173933 A1 | 8/2006 | Srinivasan et al. | |
| 2006/0235931 A1 * | 10/2006 | Ruthe et al. ................... | 709/206 |
| 2006/0239294 A1 * | 10/2006 | Wogsberg ..................... | 370/466 |
| 2006/0251073 A1 | 11/2006 | Lepel et al. | |
| 2007/0088850 A1 * | 4/2007 | Alperin et al. ................ | 709/246 |
| 2007/0208576 A1 * | 9/2007 | Lee et al. ........................ | 705/1 |
| 2009/0132463 A1 * | 5/2009 | Ducos .............................. | 707/1 |

(Continued)

FOREIGN PATENT DOCUMENTS

EP    1 489 495 A2    12/2004
JP    2006-126981    5/2006

*Primary Examiner* — Chat Do
*Assistant Examiner* — Jae Jeon
(74) *Attorney, Agent, or Firm* — Preston J. Young; McGinn IP Law Group, PLLC

(57) ABSTRACT

A method of transmitting information to a receiving computer systems includes determining in a processing unit of a computer whether a receiving computer system can receive the information without converting a local format of the information into a canonical format of the information, if it is determined that the receiving computer system cannot receive the information without converting the local format into the canonical format, then converting the local format to the canonical format and transmitting the information to the receiving computer system, and if it is determined that the receiving computer system can receive the information without converting the local format into the canonical format, then transmitting the information to the receiving computer system.

13 Claims, 8 Drawing Sheets

(56) References Cited

U.S. PATENT DOCUMENTS

2009/0138493 A1* 5/2009 Kalaboukis et al. .......... 707/101
2009/0216840 A1* 8/2009 Pajunen et al. ............... 709/206
2010/0011014 A1* 1/2010 Odulinski et al. ............ 707/101

* cited by examiner

METHOD AND SYSTEM FOR LAZY DATA SERIALIZATION IN COMPUTER COMMUNICATIONS

BACKGROUND OF THE INVENTION

1. Field of the Invention

The present invention generally relates to a method and system for lazy data serialization in computer communications, and more specifically to the field of computer communications and distributed computing systems.

2. Description of the Related Art

With modern software development practices, software used for a distributed computing environment is designed using a variety of layers, abstractions, and models. These layers of software cause much inefficiency in communications. One particular example is serialization of computer objects when need to be transmitted over a computer network to another computer. For all such conversions, the object is converted into a network format for transmission.

The current state of the art used for converting computer objects for transmission on a network is illustrated in FIGS. 1 and 2. FIG. 1 shows in flow diagram 100 the steps taken by a computer in order to transmit objects over a computer network. The procedure is entered into step 101 during a course of execution of a program in a computer system. In step 103, the procedure takes an object, which is a representation inside a computer memory of some information, and converts the object to a canonical format.

The canonical format could be the rendition of all elements into a big-endian format, the rendition of an object into an Extensible Markup Language (XML) representation according to some defined schema, or the rendition of an object into a binary format that is agreed as a standard means of exchange. In step 105, the procedure establishes a network connection to an external computer. The network connection may be established to one or more than one external computers. In step 107, the object is transmitted. The sending procedure then terminates in step 109.

As an example, many current bindings of internal Java Object use XML as a way to communicate to remote parties using Simple Object Access Protocol (SOAP). In order to convert a local representation, they may define a new converter. The codes excerpt below shows a typical example of a software package which can be used to convert a local representation "LocalFormat" to an XML format. The converter factory acts as a indirection point for looking up the right converter subroutine for a specified format, and is a commonly used pattern by Java (and other languages using object oriented paradigm) programmers.

```
public class SomeClass... {
    public static Convert(Object obj) {
        String name = obj.getClass( ).getName( )
        ConverterFactory factory = new ConverterFactory( );
        Converter XML_converter =
        factory.newXMLConverter("name");
        String converted_xml = XML_converter.convert(obj));
    }
}
```

The program fragment above corresponds to step 103 of FIG. 1. Different implementations and different class names may be used.

After the conversion to a canonical XML representation in the String format, the converted information is sent to the other party. Different pieces of software can be used for this type of transmission. A typical example can be provided in Java by a transfer using the socket interface in Java. The sending party will use a routine with a code fragment like the one shown below. This call to new Socket( . . . ) corresponding to step 105, while the call to Str.writeBytes( . . . ) corresponds to step 107.

```
Public class SomeClass {
    Public void send (String converted_xml, String host, int port) {
        Socket s = new Socket(host, port);
        DataOutputStream str = s.getOutputStream( );
        Str.writeBytes(converted_xml)
    }
}
```

If the remote address were running the same environment as the local server, e.g., had the same operating environment or middleware, then the conversion to XML could have been replaced by a more efficient serialization process. However, when the call to convert to XML is invoked, there is no indication of which address the object is going to be transmitted to. Also, there is no indication that the conversion is being done in order to transmit the data on the network.

The conversion may have been done in order to store the object into a file, to print out the object to be viewed by a person, or to store the object into a database. Therefore, in the current state of the art, such optimizations are not feasible since neither the purpose for conversion to a canonical format, nor the destination of the canonical format are known when the object is converted to the canonical format.

FIG. 2 shows the steps in flow diagram 200 used in the current state of the art by the receiving computer. The procedure is entered in step 201, and in step 203 the receiving computer establishes a connection with the sending computer. In different implementations, the method to establish a network connection may differ. For example, one may listen to a socket, other one may connect to a socket, while others may use some classes built atop the socket abstraction. In step 205, the object is received from the network connection. In step 207, the object is converted to the local format from the canonical format in which it was transmitted on the network. The procedure then terminates in step 209, and the receiving computer can perform further processing for the object that is received.

In many cases, for example, when the applications are running on the same system using hypervisors, or when the object is being sent to a machine running the same hardware and software environment, such conversion may be bypassed. However, due to the layering of the software stack, the conversion routines are unaware of the destination of the object, and cannot readily bypass such conversion.

One example of such conversion to a network format is the use of ntoh and hton macros in computer communications using an Internet Protocol Suite (TCP/IP) network transmission format. The macro hton is used to convert a data type such as integer, floating point number, or character to convert it from the host format to the network format (Big Endian format—if needed). When the local host is Little Endian, the macros are used to convert to the network format. However, if the local and remote host are both Little Endian, then the conversion at both ends can be eliminated. When the data is being formatted for transmission, the nature of the host at the other side of communication is not known, and thus it is difficult to make such an optimization.

Another example of such conversion to a network format is in the case of services-oriented architecture and web-services. In such communications, clients and servers usually communicate using XML and SOAP. The network format is an XML encoding of an object maintained in the local repository. When the object is being sent to a party which has similar characteristics as that of the sending party, such conversion may not be necessary. However, since the identity of the party to which the information is being sent is not known, it is not possible to make such an optimization easily.

Therefore, there is a need to develop a system that can delay the actual conversion of an object to the network format until the identity and nature of the remote party of a communication is known, and to determine whether the conversion can be bypassed.

SUMMARY OF THE INVENTION

In view of the foregoing and other exemplary problems, drawbacks, and disadvantages of the conventional methods and structures, an exemplary feature of the present invention is to provide a method of transmitting information between computer systems.

The method includes determining in a processing unit of a computer whether a receiving computer system can receive the information without converting a local format of the information into a canonical format of the information, if it is determined that the receiving computer system cannot receive the information without converting the local format into the canonical format, then converting the local format to the canonical format and transmitting the information to the receiving computer system, and if it is determined that the receiving computer system can receive the information without converting the local format into the canonical format, then transmitting the information to the receiving computer system. The converting the local format of information into the canonical format of information is delayed.

The determining whether the receiving computer system can receive the information without converting to the canonical format could include comparing addresses of the receiving computer system or determining if the receiving computer system is a virtual machine running on a same hypervisor.

Further, the delaying converting the local format of information includes marking the information as requiring serialization. The local format could be a representation of another computer in a structured language, such as XML.

Also, determining whether the receiving computer system can receive the information without converting to the canonical format could include comparing properties of a receiving machine against properties of a sending machine. These properties include at least one of a network address, a machine manufacturer, a machine type, and a machine name. The delaying of converting the local format could be implemented by overriding function definitions in an object oriented programming language.

Another exemplary embodiment of the present invention includes a system having a memory and at least one processor that is coupled to the memory and operative to perform the above-mentioned exemplary method.

Yet another exemplary embodiment of the present invention includes a programmable storage medium tangibly embodying a program of machine-readable instructions executable by a digital processing apparatus to perform the above-mentioned exemplary method.

With these features, the present invention may provide beneficial technical effects, such as, providing a software module that does not perform unnecessary format conversions, and allowing for a more efficient communications, in which software systems can be written to bypass the overhead of such conversion when feasible.

BRIEF DESCRIPTION OF THE DRAWINGS

The foregoing and other exemplary purposes, aspects and advantages will be better understood from the following detailed description of exemplary embodiments of the invention with reference to the drawings, in which.

DETAILED DESCRIPTION OF EXEMPLARY EMBODIMENTS OF THE INVENTION

Figure 1:
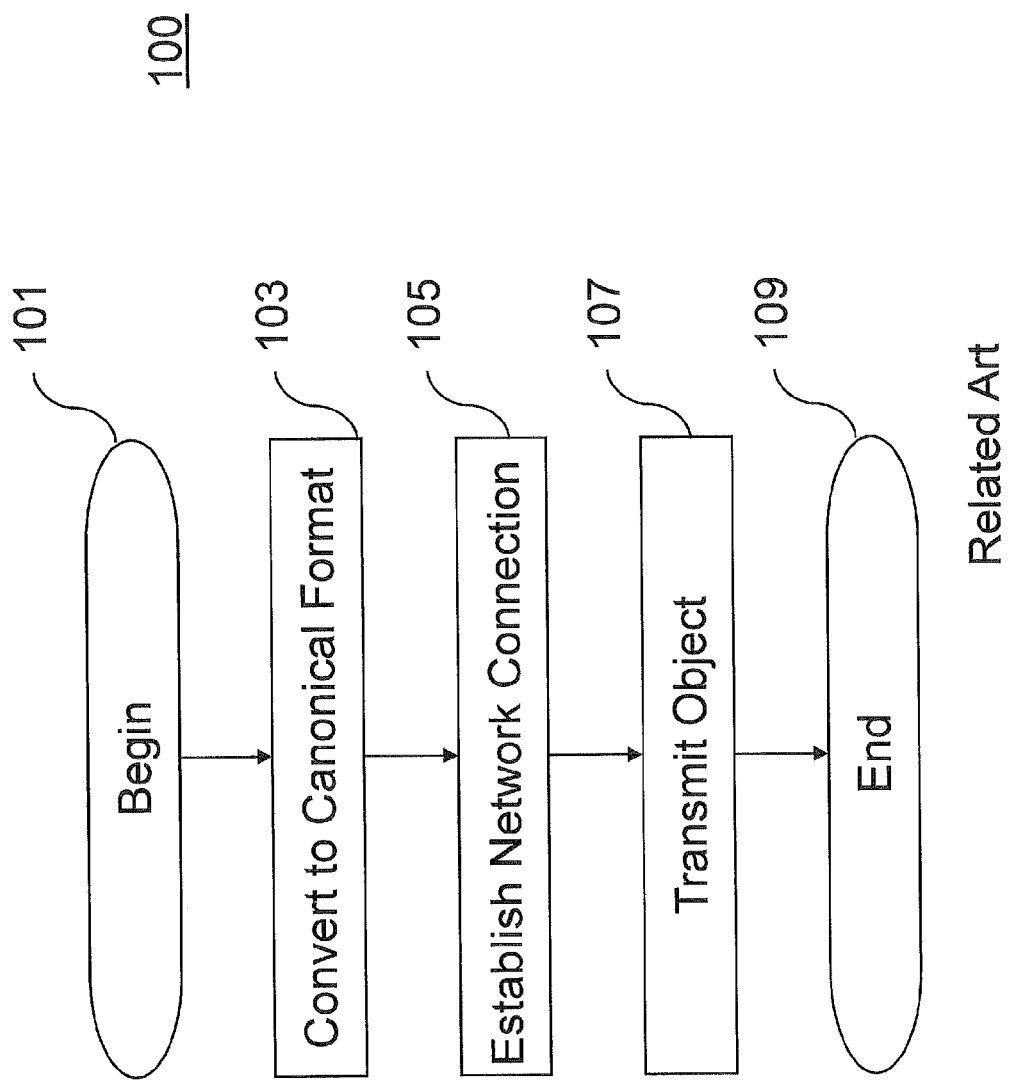
FIG. 1 illustrates a related art flow diagram 100 for steps used at a sending computer for converting objects into a canonical format and transporting the objects.
Figure 2:
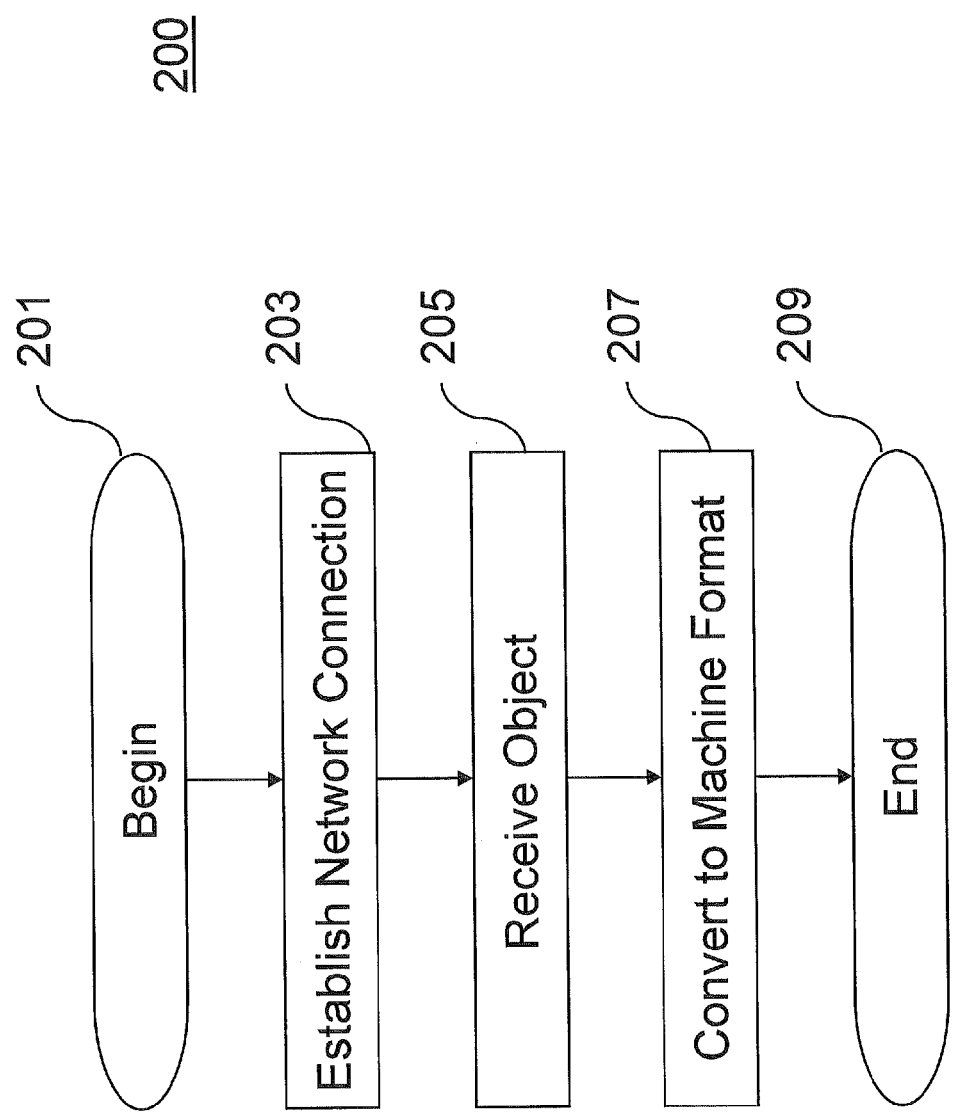
FIG. 2 illustrates a related art flow diagram 200 for steps used at a receiving computer to convert objects received from the network.

Referring now to the drawings, and more particularly to FIGS. 3-8, there are shown exemplary embodiments of the system and method according to the present invention.

Figure 3:
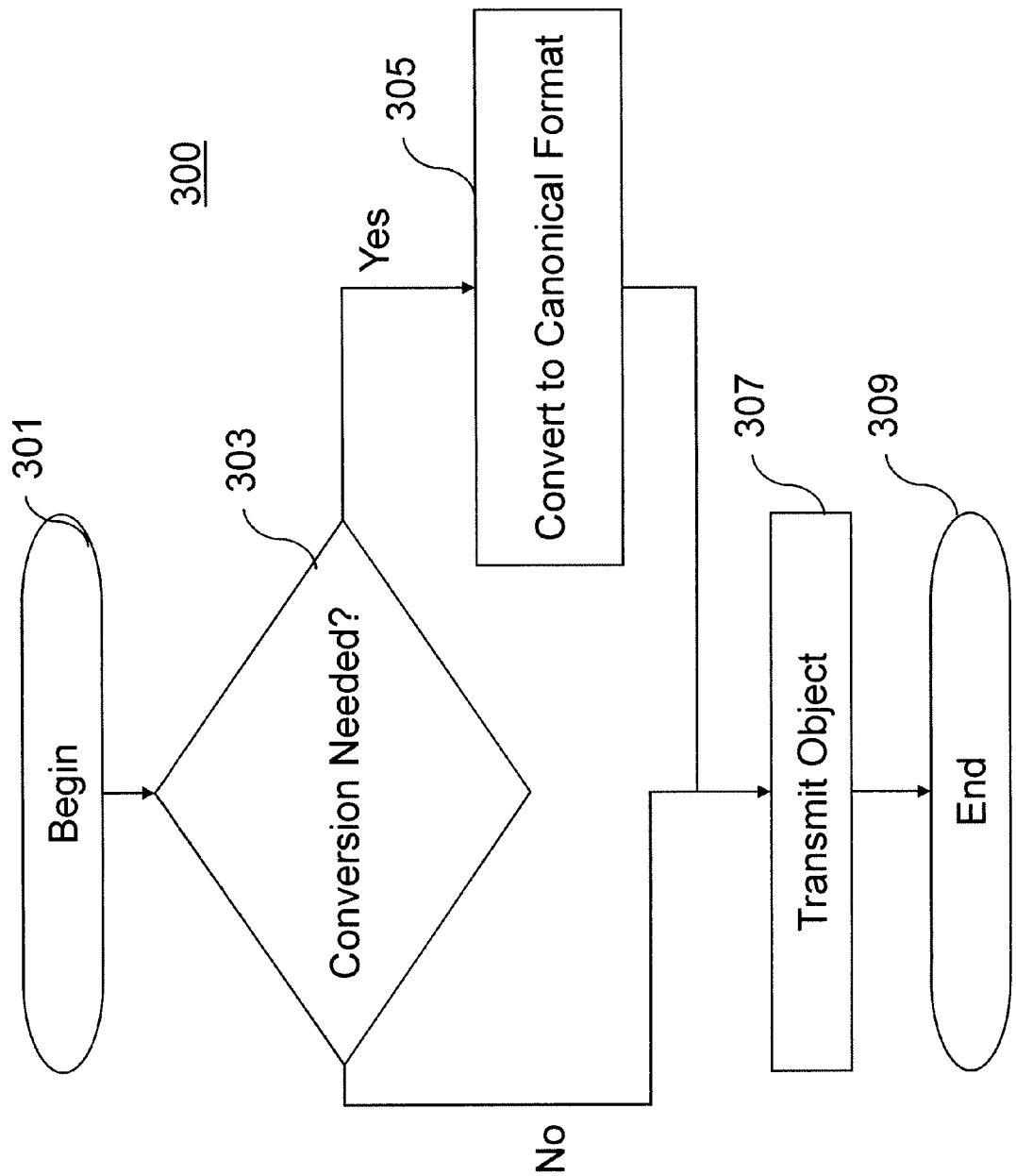
FIG. 3 illustrates a flow diagram 300 for steps used at a sending computer for converting objects into a canonical format and transporting the objects according to an exemplary aspect of the present invention.

FIG. 3 illustrates a method (flow chart 300) of transmitting information to a receiving computer system according to an exemplary aspect of present invention.

The procedure is entered in step 301. In step 303, a processing unit determines whether a receiving computer system can receive the information without converting a local format of the information into a canonical format of the information.

If it is determined that the receiving computer system cannot receive the information without converting the local format into the canonical format, then in step 305, the local format is converted into the canonical format and in step 307, the information is transmitted to the receiving computer system.

If it is determined that the receiving computer system can receive the information without converting the local format into the canonical format, then in step 307, the information is transmitted to the receiving computer system. The procedure then terminates in step 309.

Figure 4:
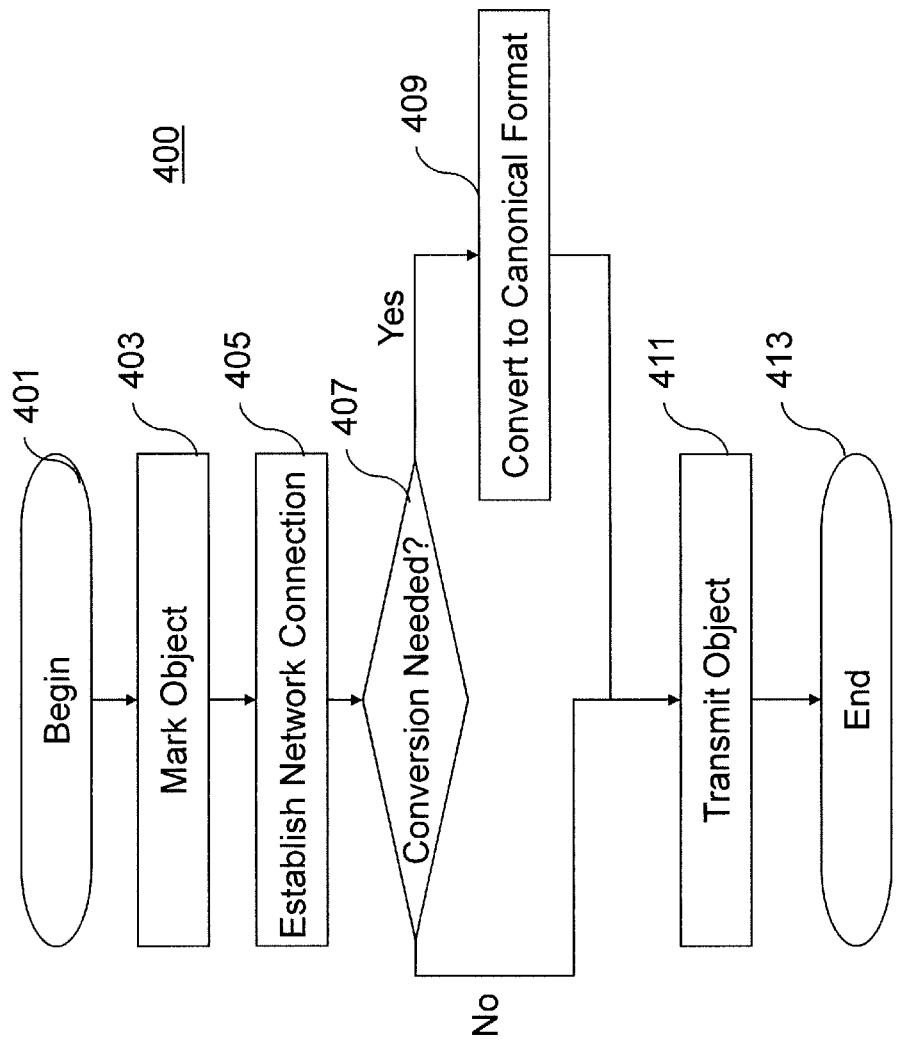
FIG. 4 illustrates a flow diagram 400 for steps used at a sending computer for converting objects into a canonical format and transporting the objects according to another exemplary aspect of the present invention.
Figure 5:
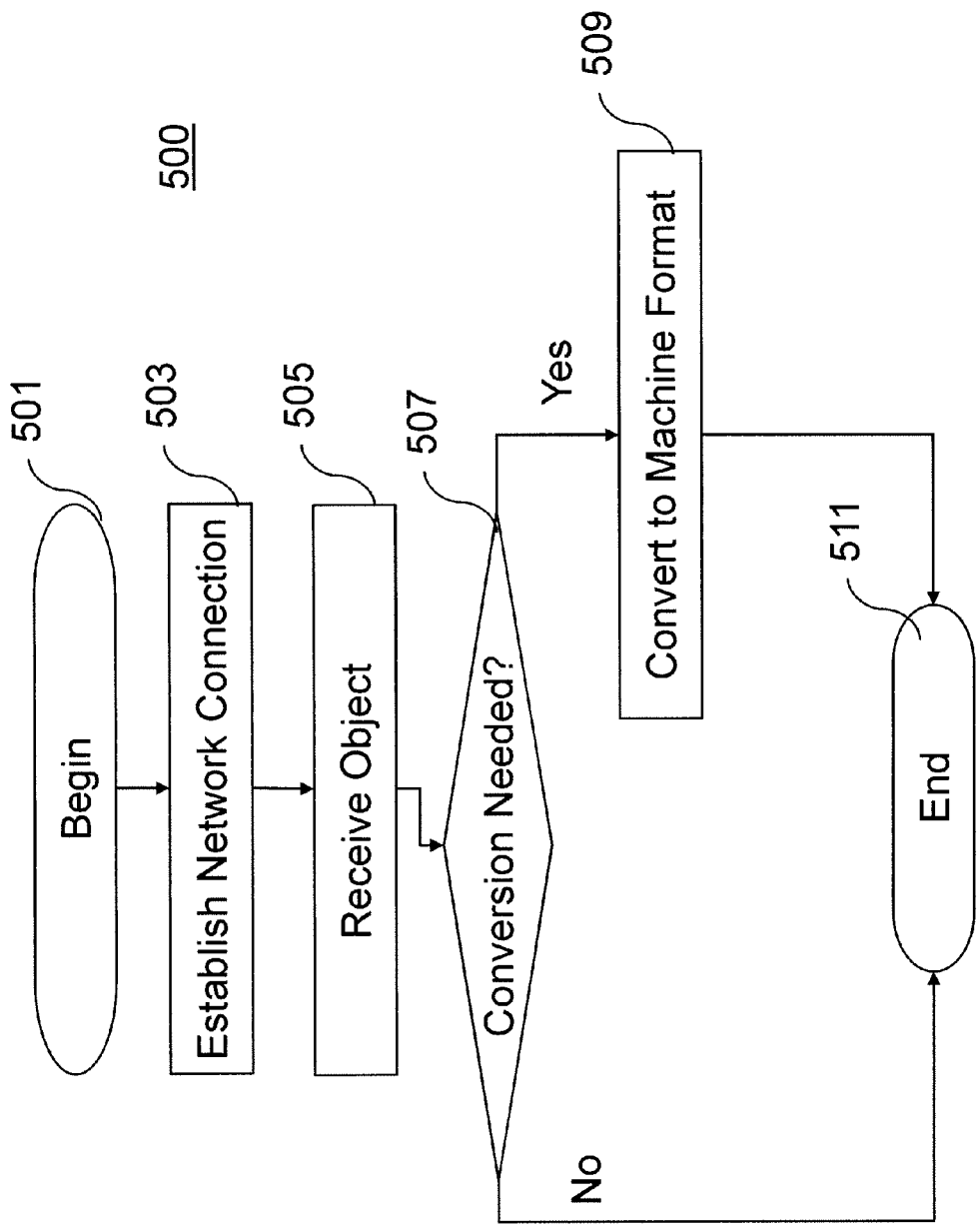
FIG. 5 illustrates a flow diagram 500 for steps used at a receiving computer to convert objects received from the network according to an exemplary aspect of the present invention.

FIG. 4 shows flow chart 400 for the steps that will be undertaken by another exemplary embodiment of the present invention.

The procedure is entered in step 401. In step 403, the procedure calls for a conversion of an object to a canonical format that can be transmitted onto the network. However, instead of converting the object to a canonical representation, the step simply marks that the object needs to be converted.

In an object-oriented paradigm, one of the ways this marking may be achieved is by having an object that has the mark flag and a pointer to the original object that was to be converted to a canonical format. In step 405, a network connection is established, as commonly known to those skilled in the art. In step 407, when the object needs to be transmitted, the procedure checks if the remote points of the network connection can accept the object without requiring conversion to a canonical format.

In one embodiment of the present invention, the check would involve checking if all of the receivers are running as virtual machines on the same hypervisor. In another embodiment of the present invention, the check would involve checking whether all of the receivers have addresses matching some criteria, with a prior arrangement that enumerates the addresses of all the machines that have the same internal format. Yet, in another embodiment of the present invention, the decision can be made by having an initial exchange during the establishment of the network connection, where the parties involved in the network connection negotiate whether they will use the native format or the canonical format for communication on the network.

If the decision in step 407 indicates that the conversion to canonical format is not needed, then the object is transmitted as it is in step 411. Otherwise, it is converted to the canonical format in step 409 before being transmitted in step 411. The procedure then terminates in step 413.

To illustrate a use case of the present invention, the software code that would be written in the case of the example illustrated earlier is described as follows. In one embodiment of the present invention, the code in step 403 would be written as shown below.

```
public class SomeClass... {
    public static Convert(Object obj) {
        String name = obj.getClass( ).getName( )
        ConverterFactory factory = new ConverterFactory( );
        Converter XML_converter = factory.newXMLConverter("name");
        LazyString converted_xml = XML_converter.lazy_convert(obj));
    }
}
```

The code to send the information would be as follows: (Step 405 is the call to new Socket( . . . ). Steps 407-411 are executed in the procedure toString.ForTransmission( . . . )).

```
Public class SomeClass {
    Public void send (LazyString converted_xml,
            String host, int port) {
        Socket s = new Socket(host, port);
        DataOutputStream str = s.getOutputStream( );
        Str.writeBytes(converted_xml.toStringForTransmission(s));
    }
```

Here LazyString is a subclass of String defined such that the conversion can be deferred until later on. The subroutine toStringForTransmission checks the address of the socket, determines whether it is safe to convert this string to a serialized format other than the standard XML version, and then creates the right byte sequence for serialization.

In the example given above, the procedure is written so that it may require changing the software code. However, depending on the programming style, it is possible to provide this functionality without making a change in the software code in other embodiments.

In order to receive the information sent in this embodiment, the receiving computer may need to make an additional change in the way it handles the received packets. The receiving computer may need to check whether the object has been sent in the local format of the receiving machine. The modified receiving process is shown in flow diagram 500 in FIG. 5.

The procedure is entered in step 501, and in step 503 the receiving computer establishes a connection with the sending computer. In different implementations, the method to establish a network connection may differ. For example, one method may listen to a socket, another one may connect to a socket, while others may use some classes built atop the socket abstraction. In step 505, the object is received from the network connection. In step 507, the procedure checks wherein a conversion is needed for packets received on the network connection.

In step 509, the object is converted to the local format from the canonical format in which it was transmitted on the network. The procedure then terminates in step 509, and the receiving computer can perform further processing for the object that is received. In one exemplary embodiment of the present invention, the check would involve checking if the sender of the object was running as a virtual machine on the same hypervisor.

In another exemplary embodiment of the present invention, the check would involve checking whether the senders have addresses matching some criteria, with a prior arrangement that enumerates the addresses of all the machines that have the same internal format. Yet, in another exemplary embodiment of the present invention, the decision can be made by having an initial exchange during the establishment of the network connection, where the parties involved in the network connection negotiate whether they will use the native format or the canonical format for communication on the network.

If the decision in step 507 indicates that the conversion to canonical format is not needed, the procedure terminates in step 511. Otherwise, the procedure performs a conversion from the canonical format to the local format in step 509 before terminating in step 511.

Figure 6:
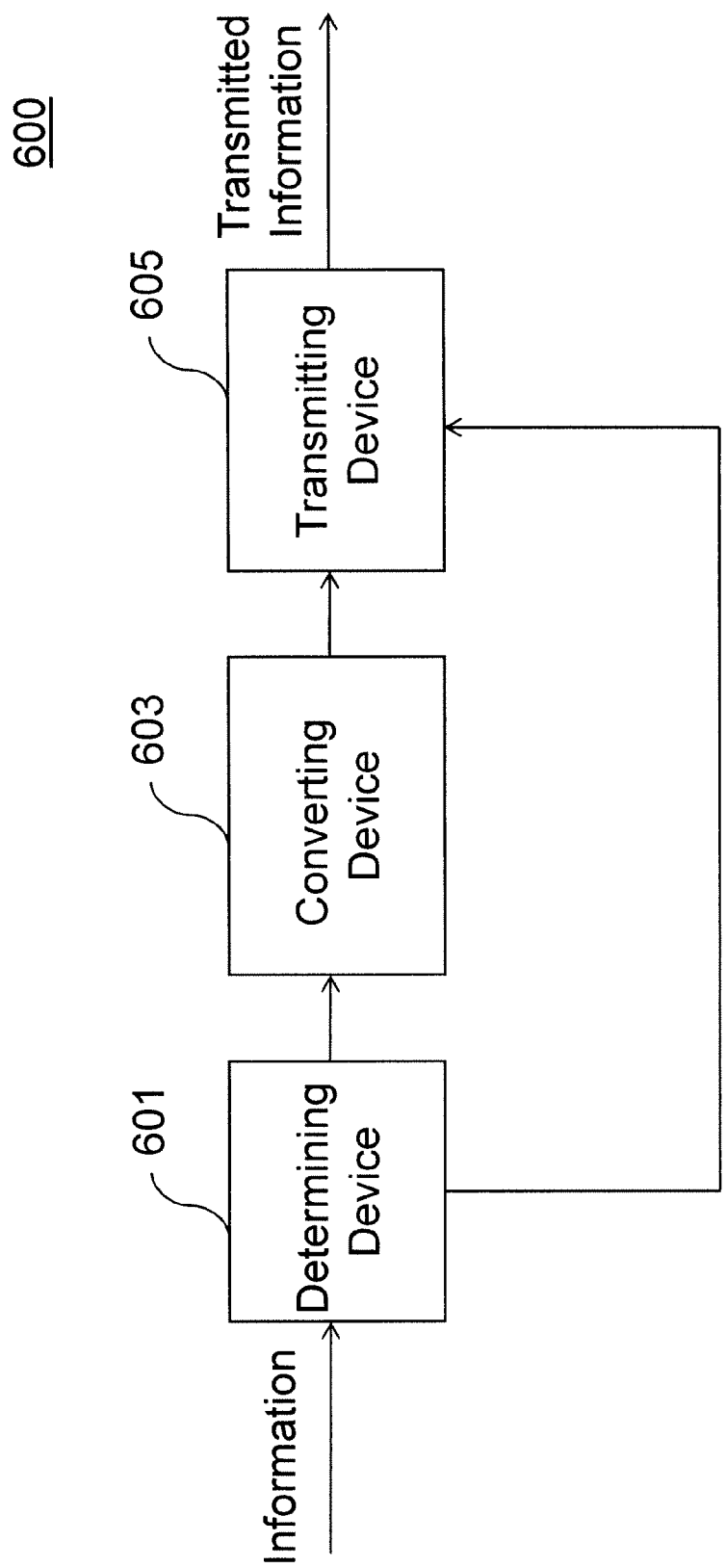
FIG. 6 illustrates a system 600 for transmission of information between computer systems according to an exemplary aspect of the present invention.

FIG. 6 illustrates a system 600 for transmitting information to a receiving computer system according to an exemplary aspect of the present invention.

The system includes a determining device 601 for determining whether the receiving computer system can receive the information without converting a local format of the information into a canonical format of the information, a converting device 603 for converting the local format to the canonical format if the determining device determines that the receiving computer system cannot receive the information without converting the local format into the canonical format and a transmitting device 605 for transmitting the information from the converting device to the receiving computer system If the determining device 601 determines that the receiving computer system can receive the information without converting the local format into the canonical format, then the determining device 601 transmits the information to the transmitting device 605.

Figure 7:
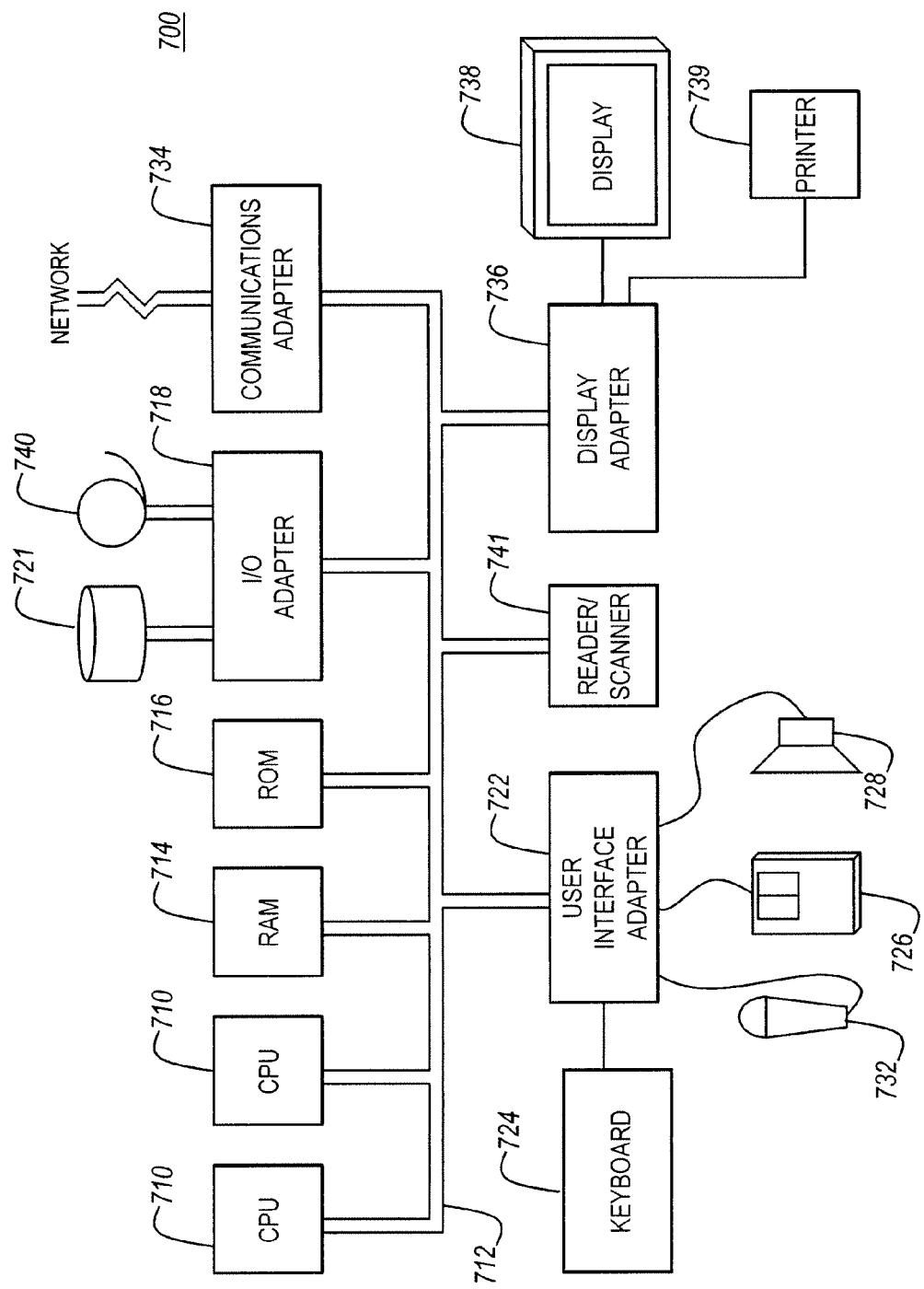
FIG. 7 illustrates an exemplary hardware/information handling system 700 for incorporating the present invention therein.

FIG. 7 illustrates a typical hardware configuration of an information handling/computer system for use with the invention and which preferably has at least one processor or central processing unit (CPU) 710.

The CPUs 710 are interconnected via a system bus 712 to a random access memory (RAM) 714, read only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, an Intranet, a personal area network (PAN), etc., reader/scanner 741, and a display adapter 736 for connecting the bus 712 to a display device 738 and/or printer 740.

In addition to the hardware/software environment described above, a different aspect of the invention includes a computer implemented method for performing the above-described method. As an example, this method may be implemented in the particular environment discussed above.

Such a method may be implemented, for example, by operating a computer, as embodied by a digital data processing apparatus, to execute a sequence of machine readable instructions. These instructions may reside in various types of signal bearing media.

This signal bearing media may include, for example, a RAM contained within the CPU 710, as represented by the fast access storage for example. Alternatively, the instructions may be contained in another signal bearing media, such as a magnetic data storage diskette 800 (FIG. 8), directly or indirectly accessible by the CPU 710.

Whether contained in the diskette 800, the computer/CPU 710, or elsewhere, the instructions may be stored on a variety of machine readable data storage media, such as DASD storage (e.g., a conventional "hard drive" or a RAID array), magnetic tape, electronic read only memory (e.g., ROM, EPROM, or EEPROM), an optical storage device (e.g. CD ROM, WORM, DVD, digital optical tape, etc.), paper "punch" cards. In an illustrative embodiment of the invention, the machine readable instructions may comprise software object code, compiled from a language such as "C", etc.

Figure 8:
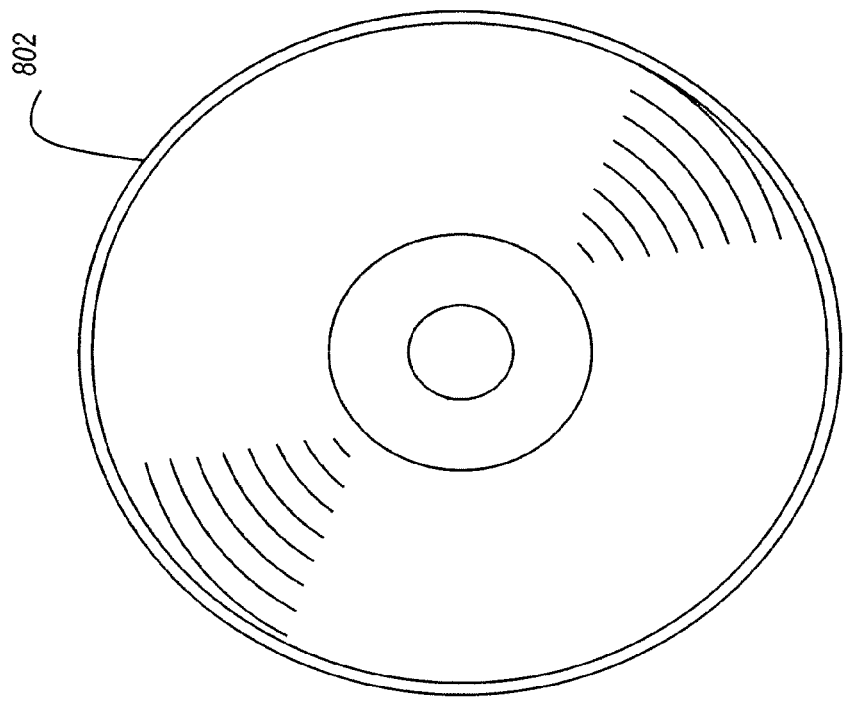
FIG. 8 illustrates a computer readable storage medium 800 (e.g., storage medium) for storing steps of a program of a method according to the present invention.
Figure 8:
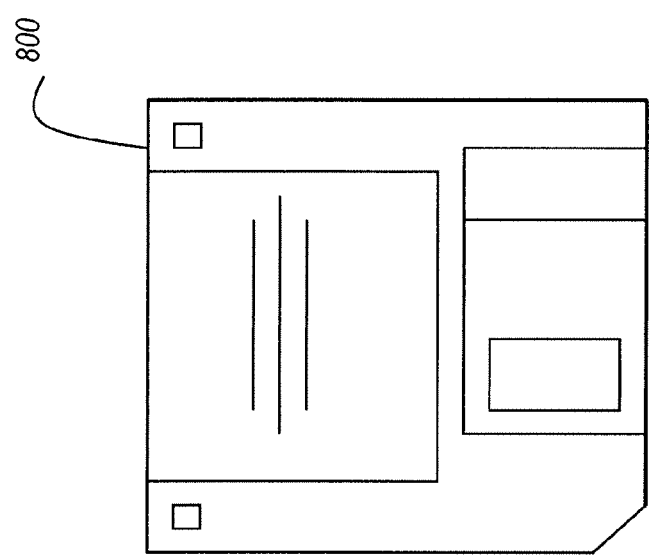

FIG. 8 illustrates a signal bearing medium 800 (e.g., storage medium) and CD ROM 802 for storing steps of a program of a method according present invention.

It should be noted that other purposes, features, and aspects of the present invention will become apparent in the entire disclosure. Modifications may be done without departing from the gist and scope of the present invention as disclosed herein and claimed as appended herewith.

In addition, it should be noted that any combination of the disclosed and/or claimed elements, matters and/or items may fall under the modifications aforementioned.

What is claimed is:

1. A method of transmitting information to a receiving computer system, said method comprising:
   determining, in a processing unit of a computer, whether the receiving computer system can receive the information without converting a local format of the information into a canonical format of the information, said determining comprising specifying whether said converting the local format into the canonical format is required or is avoidable;
   if it is determined that the receiving computer system cannot receive the information without said converting the local format into the canonical format, then delaying said converting the local format to the canonical format until an identity and a nature of the receiving computer system is identified, and then transmitting the information to the receiving computer system after said delaying said converting the local format to the canonical format; and
   if it is determined that the receiving computer system can receive the information without said converting the local format into the canonical format, then transmitting the information to the receiving computer system,
   wherein the delayed converting of said local format is implemented by overriding function definitions in an object-oriented programming language
   wherein the local format comprises a representation of another computer system in a structured language, and
   wherein said determining whether the receiving computer system can receive the information without said converting the local format into the canonical format comprises comparing properties of the receiving computer system against properties of a sending computer system, said properties comprising at least one of a network address, a machine manufacturer, a machine type, and a machine name.

2. The method of claim 1, wherein the delayed converting of said local format of information comprises marking the information as requiring serialization.

3. The method of claim 1, wherein said determining whether the receiving computer system can receive the information without said converting the local format into the canonical format comprises comparing addresses of the receiving computer system.

4. The method of claim 1, wherein said determining whether the receiving computer system can receive the information without said converting the local format into the canonical format comprises determining if a receiving computer system comprises a virtual machine running on a same hypervisor.

5. The method of claim 1, wherein said determining is made by having an initial exchange during an establishment of a network connection, in which parties involved in the network connection negotiate whether use a native format or the canonical format for communicating on a network.

6. A system for transmitting information to a receiving computer system, said system comprising:
   a determining device for determining whether the receiving computer system can receive the information without converting a local format of the information into a canonical format of the information, said determining comprising specifying whether said converting the local format into the canonical format is required or is avoidable;
   a converting device that delays said converting of the local format to the canonical format until an identity and a nature of the receiving computer system is identified, if the determining device determines that the receiving computer system cannot receive the information without said converting the local format into the canonical format, such that the information is transferred to the receiving computer system after the converting device delays said converting of the local format to the canonical format; and
   a transmitting device for transmitting the information from the converting device to the receiving computer system,
   wherein, if the determining device determines that the receiving computer system can receive the information without said converting the local format into the canonical format, then the transmitting device transmits the information to the transmitting,
   wherein said delaying said converting the local format is implemented by overriding function definitions in an object-oriented programming language,
   wherein the local format comprises a representation of another computer system in a structured language, and
   wherein said determining device compares properties of the receiving computer system against properties of a sending computer system, said properties comprising at least one of a network address, a machine manufacturer, a machine type, and a machine name.

7. The system of claim 6, wherein said delaying said converting the local format of information comprises marking the information as requiring serialization.

8. The system of claim 6, wherein said determining device compares addresses of the receiving computer system.

9. The system of claim 6, wherein said determining device determines if the receiving computer system comprises a virtual machine running on a same hypervisor.

10. A non-transitory computer-readable storage medium encoded with a computer program of machine-readable instructions executable by a digital processing apparatus to perform a method of transmitting information to a receiving computer system, said method comprising:
   determining whether the receiving computer system can receive the information without converting a local format of the information into a canonical format of the information, said determining comprising specifying whether said converting the local format into the canonical format is required or is avoidable;
   if it is determined that the receiving computer system cannot receive the information without said converting the local format into the canonical format, then delaying said converting the local format to the canonical format until an identity and a nature of the receiving computer system is identified, and then transmitting the information to the receiving computer system after said delaying said converting the local format to the canonical format; and
   if it is determined that the receiving computer system can receive the information without said converting the local format into the canonical format, then transmitting the information to the receiving computer system,
   wherein said delaying said converting the local format is implemented by overriding function definitions in an object oriented programming language,
   wherein the local format comprises a representation of another computer system in a structured language, and
   wherein said determining device compares properties of the receiving computer system against properties of a sending computer system, said properties comprising at least one of a network address, a machine manufacturer, a machine type, and a machine name.

11. The non-transitory computer-readable storage medium of claim 10, wherein said determining whether the receiving computer system can receive the information without said converting the local format comprises comparing addresses of the receiving computer system.

12. The non-transitory computer-readable storage medium of claim 10, wherein said determining whether the receiving computer system can receive the information without said converting the local format comprises determining if the receiving computer system comprises a virtual machine running on a same hypervisor.

13. The non-transitory computer-readable storage medium of claim 10, wherein the delaying said converting the local format of information comprises marking the information as requiring serialization.

* * * * *